J. H. GLAUBER, DEC'D.
THE CITIZENS SAVINGS & TRUST COMPANY, EXECUTOR.
COUPLING FOR BASINS, &c.
APPLICATION FILED DEC. 18, 1911.
1,191,886.
Patented July 18, 1916.
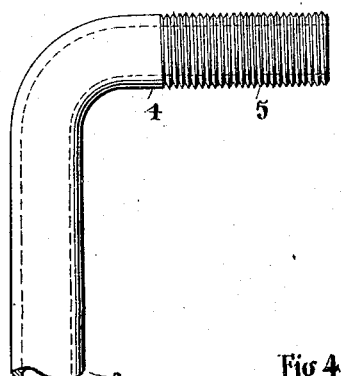
Fig. 1.
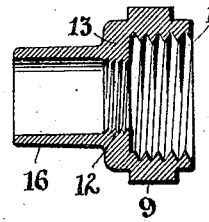
Fig. 2.
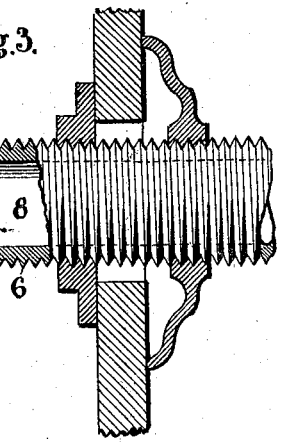
Fig. 3.
Fig. 4.
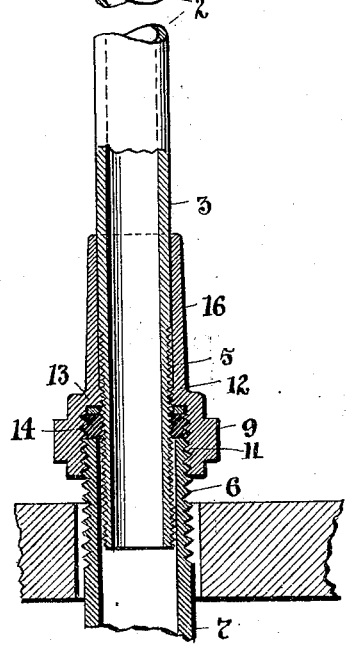
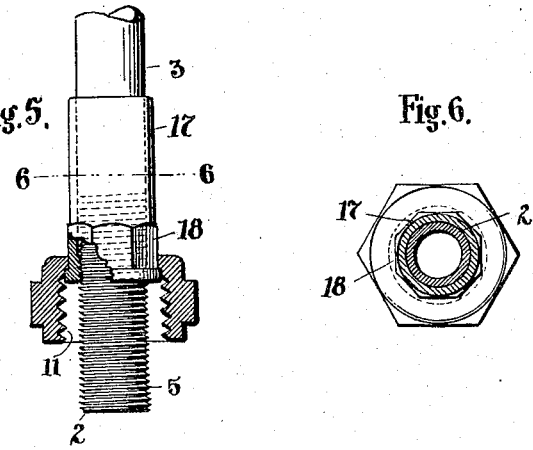
Fig. 5.
Fig. 6.
Witnesses.
F. C. Musson.
Inventor.
Joseph H. Glauber.
By Fisher Villoch
Attys.

UNITED STATES PATENT OFFICE.

JOSEPH H. GLAUBER, OF CLEVELAND, OHIO; THE CITIZENS SAVINGS & TRUST COMPANY EXECUTOR OF SAID GLAUBER, DECEASED.

COUPLING FOR BASINS, &c.

1,191,886.  Specification of Letters Patent.  Patented July 18, 1916.

Application filed December 18, 1911. Serial No. 666,495.

*To all whom it may concern:*

Be it known that I, JOSEPH H. GLAUBER, citizen of the United States, residing at Cleveland, in the county of Cuyahoga and State of Ohio, have invented certain new and useful Improvements in Couplings for Basins, &c., of which the following is a specification.

My invention relates to improvements in couplings for basins, bath-tubs and other fixtures in the same class, and the improvement resides more particularly in a coupling connection adapted to telescope together and be fixedly united by coupling means having the features of construction substantially as herein shown and particularly pointed out in the claims.

In making a coupling connection between a service or supply pipe and a faucet mounted upon a basin or bath-tub, the common practice is to employ a coupling tube which is separate from both the said pipe and faucet, but telescopically related thereto at one or both ends, to give a wide range of adjustability for different settings of the parts. The general practice also is to provide coupling nuts having slidable relation with the coupling tube.

In the present invention the coupling tube has threaded engagement with the nut or a part thereof to immovably fix the tube to the member within which it is telescoped. Now I do not lay claim to this threaded arrangement of parts broadly, except as it relates to and becomes an essential feature of the combination which includes my improved means of inclosing and reinforcing the coupling tube where the walls thereof are reduced in thickness by the screw threads.

Primarily, my object is to provide a simple means to fixedly unite the telescoped members by a threaded connection which will not only give adjustability but also the maximum of strength and durability at the point of connection, particularly to avoid rupture from internal pressures and splitting or crushing from external causes, such as an accidental blow.

In the accompanying drawings, Figure 1 is a side view, mainly in section, of a coupling tube attached to a service pipe, and showing my improvement embodied therewith. Fig. 2 is a sectional view of my improved coupling nut, and Fig. 3 is a side elevation and sectional view of a faucet shank mounted upon a portion of a bath-tub. Fig. 4 is a view of a gasket and swivel ring in section. Fig. 5 is a side elevation partly in section of a modified form of coupling, and Fig. 6 a cross section thereof on line 6—6, Fig. 5.

Now describing a coupling embodying my improvement, wherein an absolutely fixed or immovable connection is obtained after the parts have been assembled, reference is made to Figs. 1 to 4, which show a coupling tube 2 having a relatively long leg 3 and a shorter portion 4 at right angles thereto.

The extremities of both the leg 3 and portion 4 are screw-threaded over a relatively-extended surface to permit ample accommodation for telescopic adjustments, and the screw-threads 5 are preferably of plural number corresponding in lead to the single and much heavier threads 6 on service or supply pipe 7 and shank 8. Finer threads 5 are required in view of the smaller diameter of coupling tube 2 as compared with pipe 7 and shank 8, and especially in view of the lighter wall in the tube.

The means to unite coupling tube 2 with pipe 7 and shank 8 consists of coupling nuts 9, which have internal threads 11 in their larger bores corresponding to the single threads 6, and finer or plural threads 12 in their reduced portions 13 corresponding to threads 5. The separate threads in the opposite ends of the nut 9 are of course of different pitch, but have the same inclination or lead, which permits screwing of the nut upon the pipe 7 or shank 8 after coupling tube 2 is sleeved within said pipe and shank and notwithstanding that the said tube 2 is then fixed or stationary. In fact it is essential that the coupling nut shall rotate and move independently of tube 2 in making connections, and by having screw-threads of the same lead but of different pitch, the nut may be rotated freely although engaged with different parts. The object in using the nut in this manner is of course first of all to make a fixed union, and secondly, to compress a gasket 14 between the meeting surfaces at the joint so as to effect a water-tight seal.

Coupling tube 2 is threaded at its ends over a relatively-extended surface to give the coupling member a wide range of adjustability and adaptation to variously-related service pipes and faucets. Obviously, the tube is therefore weaker in its walls where threaded than in its unthreaded portion, and to protect and strengthen the threaded part of the tube where exposed, coupling nuts 9 are either provided with an integral tubular extension 16 as shown in Fig. 1, or with a separate tubular extension 17 having independent engagement with coupling nut 9, which may be constructed to interlock therewith by any suitable means, such as a hexagonal or octagonal portion 18, see Figs. 5 and 6. Extensions 16 or 17 snugly fit the tube 2 and not only serve to conceal the threads 5 on coupling tube 2, but also protect and reinforce this portion of the coupling tube where the stock is reduced by the threads 5. Strengthening or reinforcing of the member at its threaded portion will be seen to be of decided advantage when the fact is considered that coupling tube 2 is necessarily made of light gage metal to give as large a waterway as possible therethrough and also to permit the pipe to be easily bent for various adjustments, and which pipe, in any event, must be smaller in diameter than the bore of pipe 7 and the shank 8 of the faucet or cock. The lower end of tube 2 where connected with pipe 7 is especially exposed to danger as it usually extends through the floor or wall where experience has demonstrated that an accidental blow is apt to be delivered and the tube crushed or split thereby. Tubes are often forcibly bent on curved lines between their ends in making fittings and in this event the reinforcing extension 16 prevents tube 2 from kinking or abruptly bending in its thinner wall where threaded, especially if bending is resorted to after the threaded end is telescoped within pipe 7. It is well known that a thread or sharp cut in a pipe makes an easy breaking point.

Attention is directed to the fact that in order to obtain the results aforesaid, the extensions 16 or 17 are of smooth bore for part of their length and only a relatively small portion thereof is threaded to engage with the tube and to permit the other end to cover the threads regardless of telescopic adjustments.

The employment of the threaded arrangement of parts to make absolutely fixed and immovable connections as described meets a requirement for a connection capable of withstanding excessive pressures and where the fixture is liable to sag for want of proper support; but where such conditions exist it is also apparent that the need of protection in the reduced stock in coupling tube 2 where threaded, is also a factor, which is met by the inclosing and strengthening sleeve or extension 16 or 17.

What I claim is:

1. A tubular coupling member having multiple screw-threads over a relatively-extended surface at its end, in combination with a tubular connection having a single external screw thread thereon of the same lead as said multiple screw-threads, and an internal bore to telescopically receive the threaded end of said member, and a coupling nut having a separate tubular extension provided over a relatively small portion thereof with multiple screw-threads corresponding to the screw-threads on said member and the said nut having a single screw-thread corresponding to the screw-thread on said connection, and said separate tubular extension having an interlocking portion for the nut and a smooth bore to cover and protect the multiple threaded portion of said coupling member under different adjusted relations between the parts.

2. In a coupling basin or other laboratory fixture, a coupling nut having an enlarged portion provided with a bore having a single screw-thread, a separate relatively long tubular extension having a smooth bore of less diameter than said threaded bore, and provided with an interlocking portion engaged with said nut and a relatively short and slightly reduced portion at the juncture of said extension and enlarged portion having plural screw-threads of the same lead as said single screw-thread.

3. A tubular coupling member having similar multiple screw threads externally and smooth internally at opposite ends thereof, in combination with separate tubular connections for the respective ends of said member having single screw threads externally of the same lead as said multiple screw threads and bores internally adapted to receive the ends of said coupling member, and coupling nuts having single screw threads internally corresponding to the screw threads on both connections and provided with separate relatively long smooth-bored extensions interlocked therewith in slidable relations and having internal multiple screw threads corresponding to the screws on the coupling member, the smooth bored extension adapted to telescope over the threaded tubular ends of said coupling member.

In testimony whereof I affix my signature in presence of two witnesses.

JOSEPH H. GLAUBER.

Witnesses:
  R. B. MOSER,
  F. C. MUSSUN.

Copies of this patent may be obtained for five cents each, by addressing the "Commissioner of Patents, Washington, D. C."